United States Patent [19]

Rabson

[11] Patent Number: 4,815,949

[45] Date of Patent: Mar. 28, 1989

[54] IN-WELL SUBMERSIBLE MOTOR WITH STACKED COMPONENT STATOR

[76] Inventor: Thomas A. Rabson, 4521 Ivanhoe, Houston, Tex. 77027

[21] Appl. No.: 91,320

[22] Filed: Aug. 14, 1987

Related U.S. Application Data

[63] Continuation of Ser. No. 747,595, Jun. 24, 1985, abandoned.

[51] Int. Cl.$^4$ .............................................. F04B 17/04
[52] U.S. Cl. .................................... 417/417; 310/14; 318/135
[58] Field of Search ..................... 417/417, 410, 418; 318/135; 310/14, 12

[56] References Cited

U.S. PATENT DOCUMENTS

| | | | |
|---|---|---|---|
| 1,840,994 | 1/1932 | Winsor | 417/417 |
| 2,003,647 | 6/1935 | Dillstrom | 310/14 X |
| 2,365,632 | 12/1944 | Fisher | 310/14 |
| 3,435,312 | 3/1969 | DeCoster | 318/132 X |
| 3,548,273 | 12/1970 | Parodi et al. | 310/14 X |
| 3,611,783 | 10/1971 | Mittelmann | 310/14 X |
| 3,934,183 | 1/1976 | Saufferer | 310/12 X |
| 4,215,283 | 7/1980 | Hinds | 310/14 |
| 4,234,837 | 11/1980 | Kemmer et al. | 310/12 X |
| 4,518,317 | 5/1985 | Inone | 417/45 |
| 4,538,970 | 9/1985 | Rabson | 417/417 |
| 4,543,789 | 10/1985 | Norton | 417/417 X |
| 4,548,552 | 10/1985 | Holm | 417/417 |
| 4,562,385 | 12/1985 | Rabson | 310/14 X |

Primary Examiner—Carlton R. Croyle
Assistant Examiner—Leonard P. Walnoha
Attorney, Agent, or Firm—Murray Robinson

[57] ABSTRACT

A reciprocating electric motor for wells includes a stator comprising a stack of coil groups surmounted by an annular power pack, the whole being mounted on a non-ferromagnetic tube and potted and slipped into a tubular ferromagnetic housing, the coils being helically wound strips of conductive material with their outer ends folded down to extend paraxially and their inner ends folded radially thereacross and then down paraxially to provide connections between like coils in each group forming a plurality of sets for simultaneous energization, and an armature extending through the stator coils and annular power pack for reciprocation therewithin, the armature including alternating ferromagnetic and non-ferromagnetic sections.

5 Claims, 4 Drawing Sheets

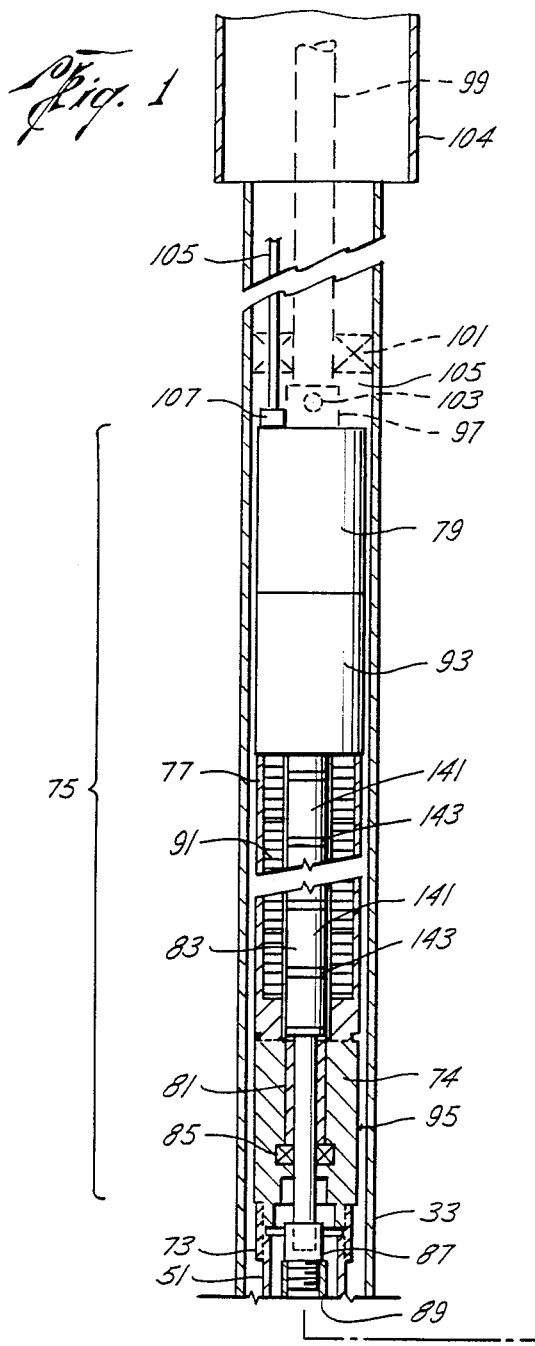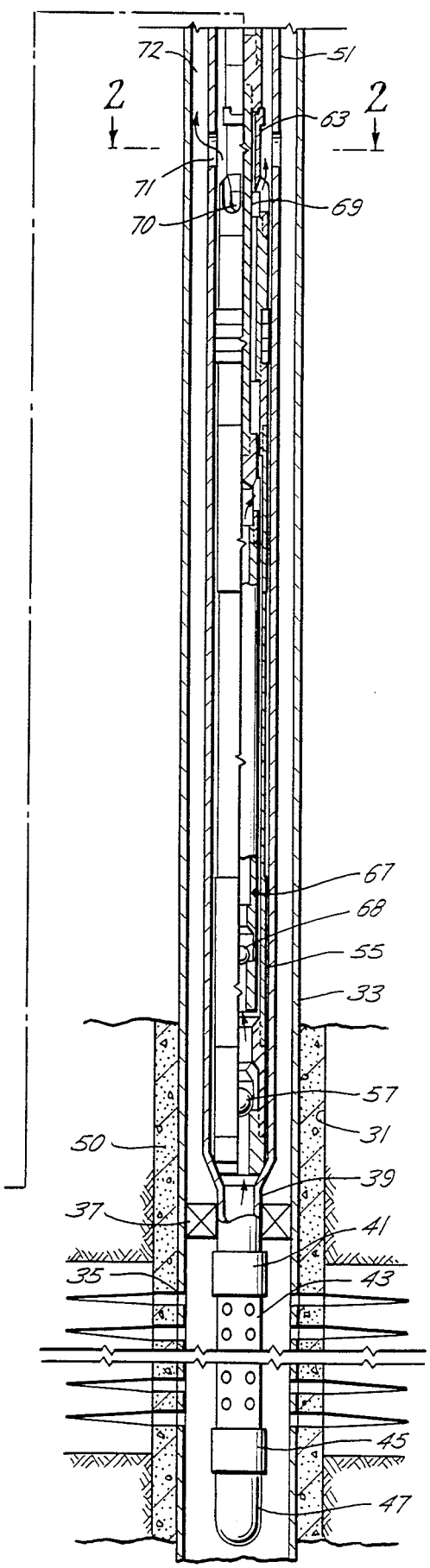

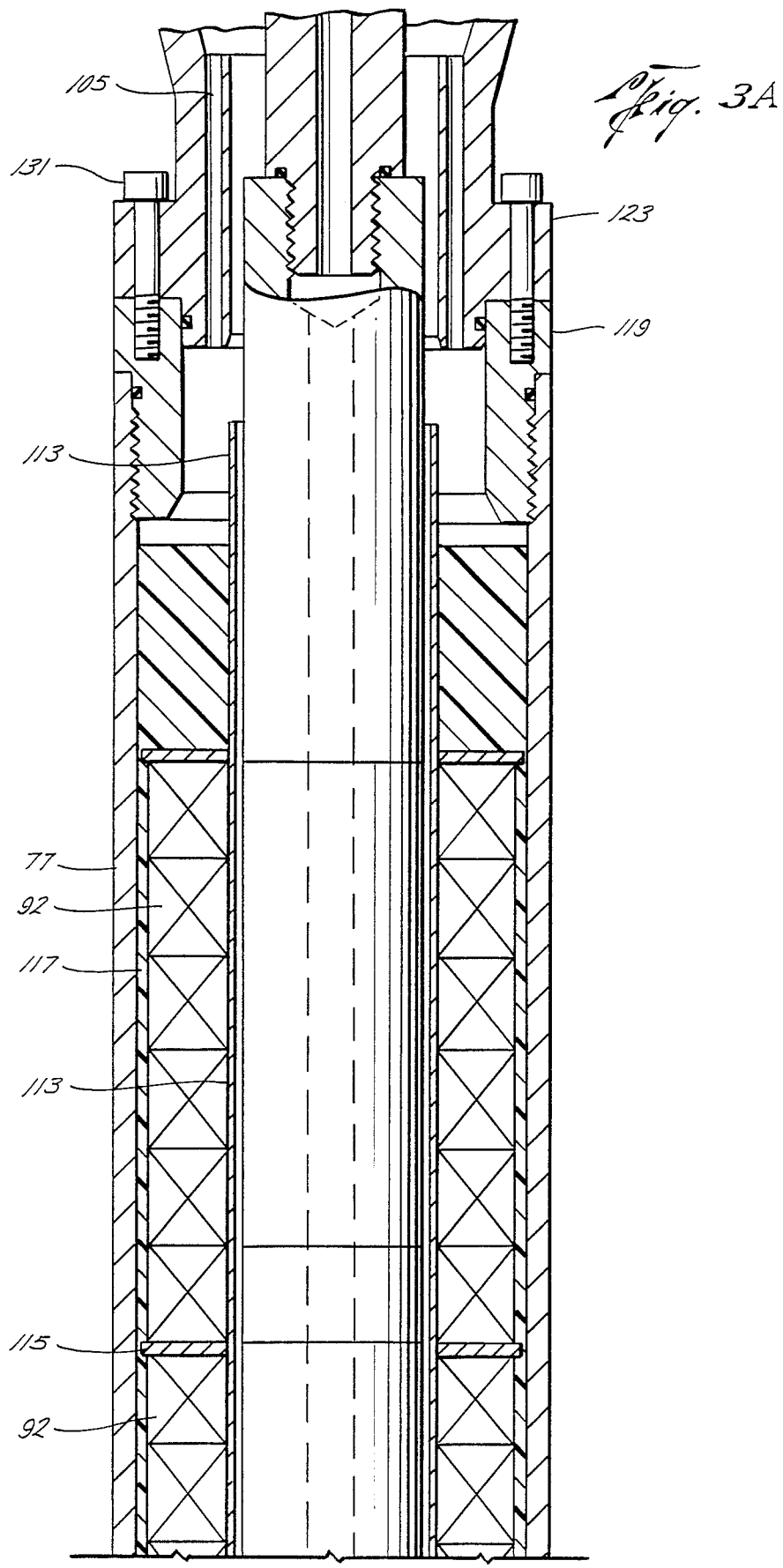

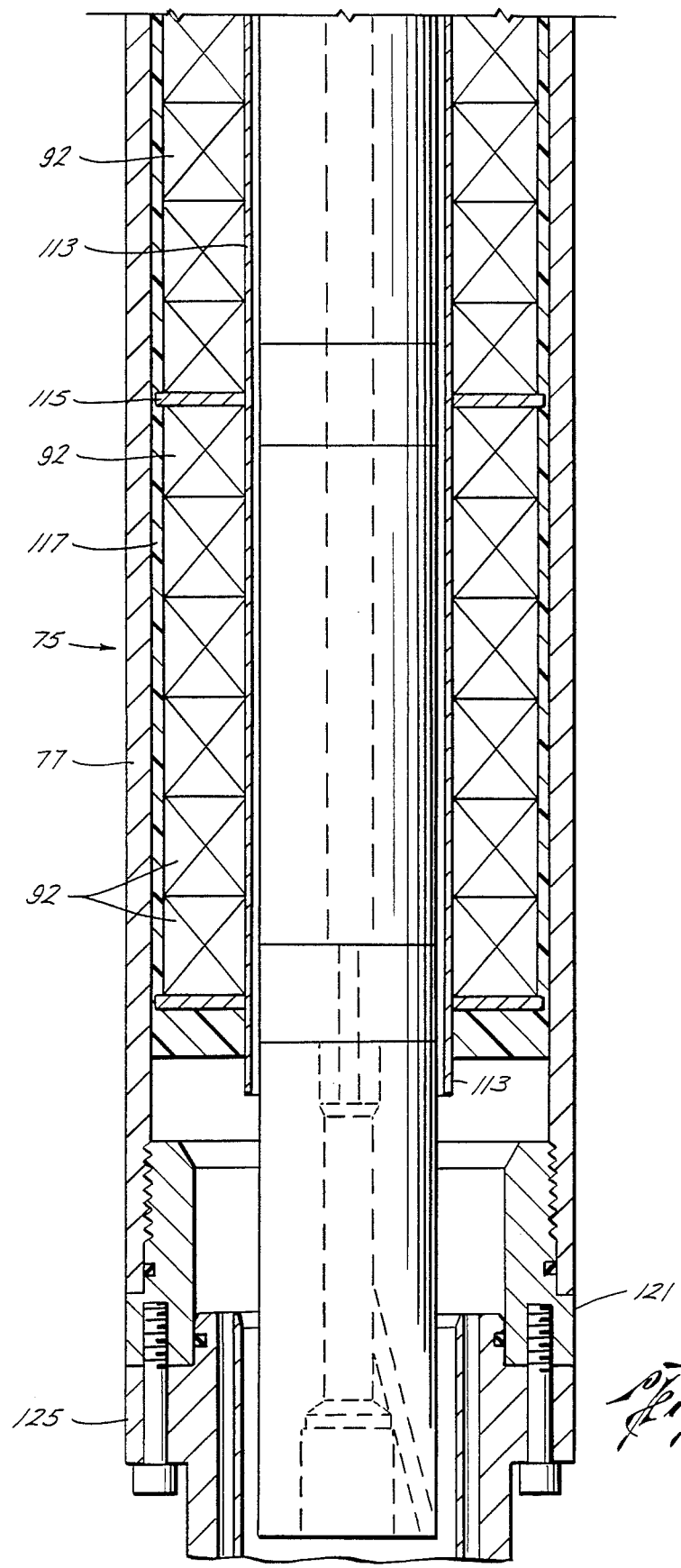

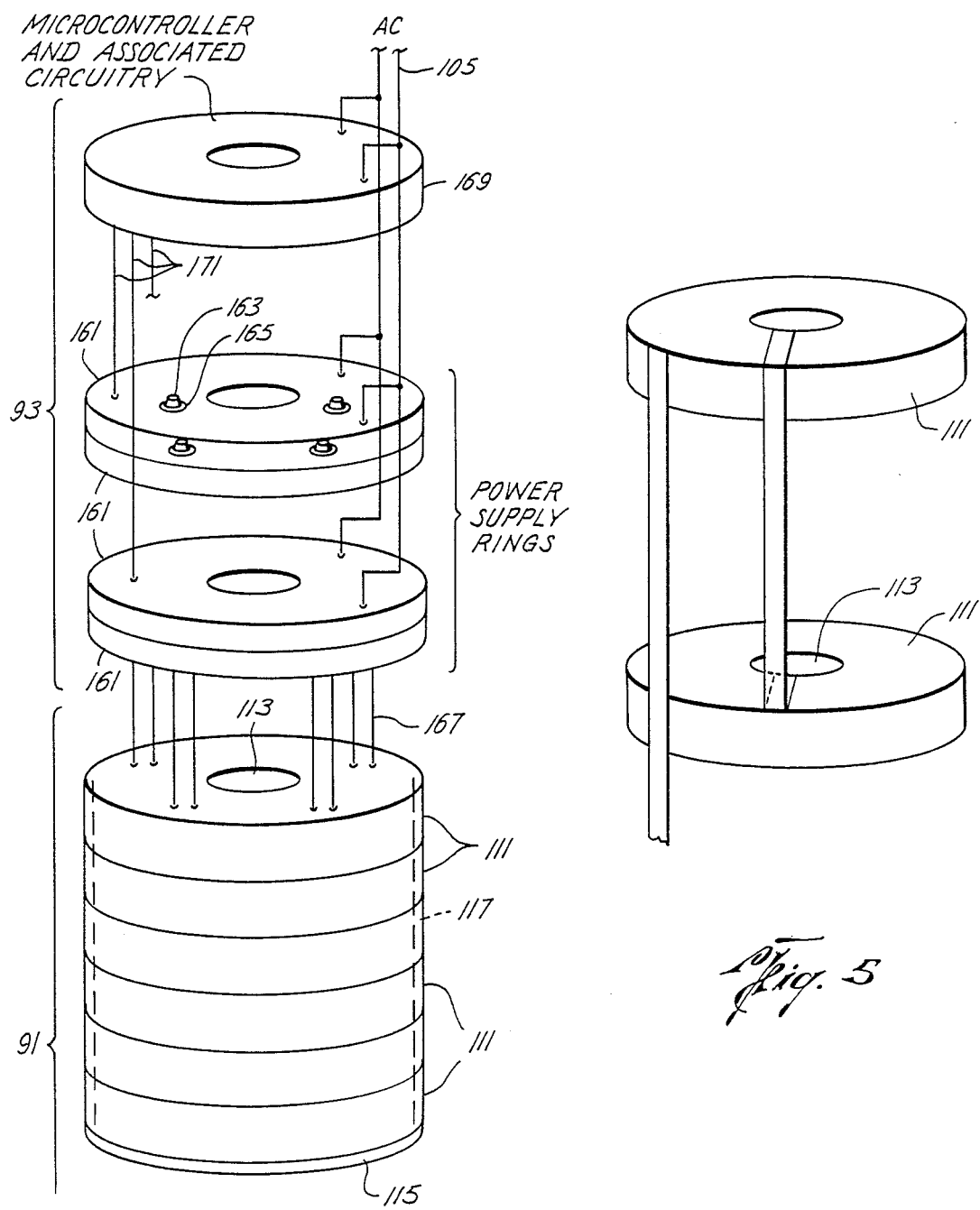

IN-WELL SUBMERSIBLE MOTOR WITH STACKED COMPONENT STATOR

This is a continuation of application Ser. No. 747,595, filed June 24, 1985, now abandoned.

SUMMARY OF THE INVENTION

This invention relates to electric motors and more particularly to a submersible reciprocating motor especially adapted for use in actuating a reciprocating pump placed at the bottom of an oil well, although it may still find utility in other applications, e.g. robotics.

In an application filed Oct. 17, 1983 entitled Periodic Reciprocating Motor, Ser. No. 542,634 applicant has disclosed a motor comprising an armature having a plurality of sections alternately of ferromagnetic and non-ferromagnetic material which travels axially within and is reciprocated by a stator comprising a stack of coils. The coils are arranged in groups. There are a plurality of groups with the corresponding coils of each group being connected as a set for simultaneous energization. The sets are successively energized, several at a time to produce a plurality of moving fields simultaneously to sweep the armature sections in one direction from one end toward the other. After one tandem sweep has been made and the armature moved one section length the sweep is repeated in the same direction to move the armature another section length. The tandem sweeps are repeated until the armature has moved the desired distance (stroke). Then the tandem sweeps are reversed to move the armature in the opposite direction a full stroke, completing one cycle. The cycle is repeated as long as desired.

As disclosed herein, for use with a conventional sucker rod pump, the motor may be placed above the pump with its armature connected to the traveling valve and suitable flow path means provided to communicate the pump outlet with the pipe string above the motor.

The present invention relates to a construction of the motor adapting it to the geometry and environment at the bottom of an oil well.

The stator coils are of an annular disc or washer-like configuration, i.e. of less height than the outer diameter of the coils. The coils are formed of insulated ribbons of copper or other conductive material. The inner end of each coil is brought over the top or bottom of the coil to the outside and folded down along the outside of the coil adjacent to the similarly positioned outer end of the coil. The like coils of each group, that is, all the coils in one set, have their inner and outer ends connected, e.g. in series or in parallel. The power supply for each set of coils is disposed in an annular pack at one end of the motor stator. The stack of coils and power supply are potted in insulating material and slid into a support tube.

The invention incorporates a number of novel structural features of both specific and general applicability. These and other novel features and advantages of the invention will be set forth in detail hereinafter.

BRIEF DESCRIPTION OF THE DRAWINGS

For a detailed description of a preferred embodiment of the invention reference will now be made to the accompanying drawings wherein:

FIG. 1 is a schematic vertical section through a well illustrating in elevation a pump driven by a motor, embodying the invention, disposed in the well.

FIG. 2 is a section at plane 2—2 of FIG. 1,

FIGS. 3A, 3B together form a vertical section through the motor.

FIG. 4 is a pictorial view showing the assembly of the stator coils, power supply discs, and microcontroller.

FIG. 5 is a pictorial view showing the manner of interconnecting the field coils.

As a matter of immediate clarification it may be noted that each stator unit or module includes a group of e.g. six, coils sequentially energized in subgroups of e.g. 3 coils, and that the several coils in the group are each electrically connected, e.g. in series, with other like coils of other units of modules forming a set of coils all powered from a single separate power supply, the number of coils in the set being equal to the number of stator units employed in tandem, and the armature has multiple sections greater in number than the number of coils in each set (which is the number of coil groups) thereby increasing the motor stroke beyond that achieved by one coil group working on one armature section. Plural coils are used in a group to obtain long smooth thrust; plural coils are employed in a set to increase force, armature length in excess of stator length is employed to obtain extra long stroke.

DESCRIPTION OF PREFERRED EMBODIMENT

—Motor/Pump Assembly in Well—

Referring now to FIG. 1, there is shown a well bore 31 in which is disposed a well casing 33 perforated at 35. Within the casing is set a hookwall packer 37, shown schematically since any suitable known packer may be employed e.g. a packer as disclosed in the 1982–83 Composite Catalogue of Oil Field Equipment & Services at pages 7072, 7073 (Pengo). Extending through the packer and supported thereby and sealed thereto is a tailpipe 39 connected at its lower end by coupling 41 to perforated nipple 43, the lower end of which is connected by coupling 45 to bull plug 47 closing the lower end of the string of pipe elements. Perforated nipple 43 is opposite casing perforations 35, which are adjacent a producing formation. The casing may be secured in position in the well bore by cement 50.

To the upper end of tailpipe 39 is secured pump receiver 51 in which is secured a stationary barrel for anchor pump 53 as described on page 6 of API Spec. 11 AX Seventh Edition, June 1979, of the American Petroleum Institute.

The pump includes a barrel 55 in the lower end of which is a ball check type of standing valve 57, the body of which may be a cylindrical tube. Within the barrel 57, mounted for reciprocation coaxially therewithin, is a plunger or pump piston 67, within which is a ball check type of traveling valve 68. Piston rod 69 connected to piston 67 extends out of the upper end of the barrel, which is open at 70 for the discharge of fluid into the pump receiver and thence through ports 71 into casing annulus 72.

The upper end of pump receiver 51 is secured by screw connector 73 to lower out-board support 74 of linear motor 75. Support 74 is bolted or in other manner suitably releasably sealingly secured to tubular (preferably cylindrical) housing 77 of the motor. Upper outboard support 79 is likewise suitably bolted or otherwise releasably sealingly secured to the upper end of motor housing 77.

Within each of supports 74, 79 is a sleeve bearing such as shown at 81, providing means mounting motor armature or mover 83 for reciprocation coaxially with bearing 81 and housing 77. Suitable annular seal means, such as that shown at 85, are provided in each of supports 73, 79 to seal between motor armature 83 and the respective supports. The lower end of the armature is secured to the pump piston rod by screw connector 87, the upper end of the plunger being provided with a threaded pin 89 to receive the connector.

The motor includes field windings 91 coaxial with motor housing 77 and the motor bearings and with armature 87. Above the field windings and below support 79 is power supply 93 contained within housing 77, whereby the motor has a self-contained power supply.

Motor housing 77 is of smaller outer diameter than the inner diameter of well casing 33, leaving an annular passage 95 therebetween, being a continuation of and connecting the upper and lower portions of casing annulus 73.

A screw connector 97 may connect upper out-board motor support 79 with the lower end of a string of tubing 99. The tubing string is sealed to the casing by hookwall packer 101, which may be similar to packer 37. Within connector 97 is a lateral port 103 for admitting fluid to the tubing from the casing annulus 105. Tubing string 99 extends to the earth's surface inside surface casing 104. Casing 33 may also extend to the surface between the tubing and outer casing or may be supported within and sealed to the latter by a conventional liner hanger-packer (not shown).

Connector 97, tubing 99, packer 101 and port 103 are shown in dotted lines since they may be omitted if production is through the casing rather than the tubing.

To the upper end of upper out-board motor support 79 is connected electrical conductor cable 105 for conducting electricity from the earth's surface down the well bore to motor power supply 93. Cable 105 is sealed to motor support 79 by seal means 107. The cable is placed in casing annulus 61 alongside tubing 99, and seal 107 is positioned eccentrically to the motor axis alongside of valve 97, and packer 101 is provided with an eccentric passage through which the cable can extend from below to above packer 101.

In operation, when motor armature 83 moves up, lifting pump piston 67, traveling check valve 69 will close and liquid will be lifted up out of the barrel into annulus 72, and liquid (fluid) in tailpipe 39 will rise through lower standing valve 53 into pump barrel 55. When the armature moves down the traveling valve will open allowing free fall of the piston, and the standing check valve will close preventing back flow out of the barrel.

When the motor armature again rises, due to the action of the field windings thereon, additional liquid is drawn up into the barrel through the lower standing valve and the piston will lift additional fluid out of the barrel and force it into the casing annulus 72 below motor 75.

As the motor continues to reciprocate, more formation liquid will be driven into annulus 61, displacing whatever air, mud, water, or other fluid which was there before. The formation liquid will rise around and past and cool motor 75. The liquid will continue to the earth's surface through the well casing (33 and/or 105) or via port 103 into tubing 99 and thence to the earth's surface.

—Pump Motor—

Referring now to FIGS. 3A, 3B, 3C, 3D there is shown in more detail the stator of linear motor 75 of FIG. 1. As there shown, field winding 91 includes a plurality of coils 92 stacked coaxially within motor housing 77 on a non-ferromagnetic support tube 113. The coils are stacked in groups of e.g., six, with an electrically insulating spacer ring 115 at the lower end of each group, each group constituting one motor stator module or unit. Each unit is coated with insulating tape or a layer of epoxy 117 to keep it out of electrical contact with housing 77, for the latter, being made of ferromagnetic material, is inherently somewhat electrically conducting and might short circuit the coils should their wire insulation fail, e.g., when the field winding is slid into the motor housing. On the other hand, support tube 113 is made preferably of a strong oil, water and corrosive resistant material such as stainless steel to protect against wear as the motor armature reciprocates therein, for despite the best seals, well formation fluid, which may be a sandy, sulfurous, oil-brine emulsion, may accumulate inside the motor.

The field winding, including the support tube and solenoids, is held in position within the motor by upper and lower threaded rings 119, 121 screwed into the ends of the housing and upper and lower rings 123, 125 screwed to the ends of rings 119, 123. Screws 131 extend through upper ring 125 and engage the ring 119 to secure ring 125 in place.

Referring again to FIG. 1, armature 83 comprises a plurality of long cylindrical sections 141 of ferromagnetic material separated by short cylindrical sections 143 of non-ferromagnetic material. These sections may be tubular and sleeved over a bar of non-ferromagnetic material and held in place thereon by nuts screwed onto the threaded ends of the rod, or they may be solid cylinders with pin and socket connectors at their ends, which are screwed together.

The length of each armature module, comprising one ferromagnetic and one non-ferromagnetic section, equals the length of one stator module: the total length of the armature equals the length of the motor stator plus the stroke of the pump less the length of one armature module.

The length of each armature and stator module depends on the number of stator coils employed in each group, which in turn depends on the number of ampere turns required to saturate the armature, the radial dimensions of the well bore, the thermal duty cycle of the motor, and the efficiency in developing force between the field windings and armature sections, all of which are determined in some degree empirically. For example, the following motor specifications have been found to be suitable:

| | |
|---|---|
| Stroke | 15 feet |
| Housing OD | 4" |
| Housing length | 20 feet |
| Coil ID | [2¼"] 2⅝" |
| Coil OD | 3½" |
| Coil height 1" | |
| Coils/Group 6 | |
| Armature Ferromagnetic section length 5" | |
| Arm non-ferromagnetic section length 1" | |

-continued

| | |
|---|---|
| Armature O.D. [2"] 2¼" | |
| Armature length | 35 feet |
| Stator housing & armature ferromagnetic materials | Low Carbon steel |
| Armature non-ferromagnetic material | Aluminum [M (300K)] |

—Power Supply—

Referring now to FIG. 4, power supply unit 93 mounted in the upper part of the motor housing above the field winding (as described with reference to FIG. 1) includes a plurality of power supply discs 161 equal in number to the number of field coils 111 in each group. Pin and socket electrical connectors 163, 165 provide for local and through connections from the discs to the field coils. Connectors 167 interconnect the sets of field coils with the discs. The field coils in one group are connected with those in other groups, e.g. if the several coils in one group are each in series with the respective coils in the other groups, as is typical, or in parallel therewith, as may be preferred. Such connection may be provided by ribbon conductors provided by the folded ends of the coils, if the latter are made of ribbons, as shown in FIG. 5. Electricity, single phase ac, is supplied to the power supply discs by electric cable 105 (see also FIG. 2).

A control means 169 generates signals in accordance with a program that is initially set but which preferably can be changed by command from outside the motor, e.g. electrical signals sent from the surface via cable 105 by any suitable means (not shown). The signals from the microcontroller are sent, e.g. via electric conductors 171 to the several power supply discs to control their outputs connected to the field coils. For a description of one suitable way to generate such signals and control the power supply disc output see applicant's aforementioned application entitled Periodic Reciprocating Motor. Control means 169 is also of annular configuration to accommodate the motor armature extending therethrough.

While a preferred embodiment of the invention has been shown and described, modifications thereof can be made by one skilled in the art without departing from the spirit of the invention.

I claim:

1. A submersible deep oil well pump motor comprising:
 a linear armature including a plurality of elongated equal-length sections of ferromagnetic material separated by equal-length sections of non-ferromagnetic material of shorter length than said ferromagnetic sections, each ferromagnetic section and one adjacent non-ferromagnetic section constituting an armature module,
 a linear stator including an inner tube concentrically surrounding said armature in relatively axially slidable relationship, and an outer tube concentric with and radially spaced outwardly from said inner tube and means connecting said inner tube and outer tube at each end of the tubes forming a closed annulus therebetween,
 said stator further including a plurality of annular field modules, said field modules being equal in length to said armature modules, each field module including a stack of a plurality of annular equal-diameter field coils, at least one coil in each module being electrically connected respectively with at least one corresponding coil in each of the other modules forming therewith a set of coils, and
 means for sequentially energizing adjacent sets of coils so that a first energizing cycle moves said linear armature in one direction and a second energizing cycle moves said linear armature in the opposite direction.

2. Motor according to claim 1,
 said stator further including a power supply for each set of coils together forming an annular power supply pack stacked in said annulus adjacent one end of said stack of field modules.

3. Motor according to claim 2, each power supply comprising a disc shaped body, the discs being stacked to form said power supply pack.

4. Motor according to claim 2, said stack of field modules and said annular power pack being potted in insulating material forming a unitary assembly slidably positioned upon said inner tube for easy assembly and disassembly.

5. Motor according to claim 1,
 each of said coils being formed of insulated ribbons of conductive material, said coils in each set being interconnected by ribbon conductors provided by the outer ends of the coils folded back along the outside of the stack and the inner ends of the coils each folded over the end of the respective coil to bring it to the outside of the coil and then folded back along the outside of this coil.

* * * * *